US011887151B2

(12) United States Patent
Son et al.

(10) Patent No.: US 11,887,151 B2
(45) Date of Patent: Jan. 30, 2024

(54) METHOD AND APPARATUS FOR PROVIDING ADVERTISEMENT DISCLOSURE FOR IDENTIFYING ADVERTISEMENTS IN 3-DIMENSIONAL SPACE

(71) Applicant: KOREA ADVANCED INSTITUTE OF SCIENCE AND TECHNOLOGY, Daejeon (KR)

(72) Inventors: Sooel Son, Daejeon (KR); Joon Gyum Kim, Daejeon (KR)

(73) Assignee: KOREA ADVANCED INSTITUTE OF SCIENCE AND TECHNOLOGY

( * ) Notice: Subject to any disclaimer, the term of this patent is extended or adjusted under 35 U.S.C. 154(b) by 0 days.

(21) Appl. No.: 17/671,114

(22) Filed: Feb. 14, 2022

(65) Prior Publication Data
US 2023/0259966 A1    Aug. 17, 2023

(51) Int. Cl.
*G06Q 30/02*        (2023.01)
*G06Q 30/0242*      (2023.01)
*G06F 3/01*         (2006.01)
*G06Q 30/0251*      (2023.01)
*G06Q 30/0241*      (2023.01)

(52) U.S. Cl.
CPC ......... *G06Q 30/0244* (2013.01); *G06F 3/013* (2013.01); *G06Q 30/0269* (2013.01); *G06Q 30/0277* (2013.01)

(58) Field of Classification Search
CPC .......... G06Q 30/0244; G06Q 30/0269; G06Q 30/0277; G06F 3/013
See application file for complete search history.

(56) References Cited

U.S. PATENT DOCUMENTS 4,710,716 A * 12/1987 Keren ............... G01R 33/4833
                                              324/309
10,192,135 B2 *  1/2019 Krenzer ............... G06F 17/145
11,221,750 B2 *  1/2022 Krishnamurthy ....... G06T 19/20
(Continued)

FOREIGN PATENT DOCUMENTS

KR      20120048888 A     5/2012
KR        101318654 B1   10/2013
(Continued)

OTHER PUBLICATIONS

Federal Trade Commission 2013 (".com Disclosures: How to Make Effective Disclosures in Digital Advertising", https://www.ftc.gov/business-guidance/resources/com-disclosures-how-make-effective-disclosures-digital-advertising. accessed 2023. Hereafter: FTC.) (Year: 2013).*

(Continued)

*Primary Examiner* — Eric R Netzloff
(74) *Attorney, Agent, or Firm* — Harness, Dickey & Pierce, P.L.C.

(57) ABSTRACT

The present disclosure in at least one embodiment provides a method of providing an advertisement disclosure for advertisement identification to a content that is displayed in a three-dimensional space by a visual interface, including detecting an advertisement object located within a user sight from the content, inserting the advertisement disclosure in an adjacent position to the advertisement object, and controlling the advertisement disclosure in position or orientation based on a user gaze upon detecting the user gaze.

10 Claims, 7 Drawing Sheets

(56) References Cited

U.S. PATENT DOCUMENTS

| | | | | |
|---|---|---|---|---|
| 2009/0295907 | A1* | 12/2009 | Kim | H04N 19/597 |
| | | | | 348/E13.001 |
| 2014/0313124 | A1* | 10/2014 | Kim | G06V 40/18 |
| | | | | 345/156 |
| 2017/0358144 | A1* | 12/2017 | Schwarz | G06F 3/017 |
| 2018/0315248 | A1 | 11/2018 | Bastov et al. | |
| 2018/0321738 | A1* | 11/2018 | Jassal | G06Q 30/0261 |
| 2019/0208285 | A1* | 7/2019 | Chapman | H04N 21/25891 |
| 2020/0322586 | A1* | 10/2020 | Lee | H04N 21/8583 |
| 2021/0232653 | A1* | 7/2021 | Ivanov | G06F 40/166 |
| 2021/0281822 | A1* | 9/2021 | Ikeda | G06T 7/73 |

FOREIGN PATENT DOCUMENTS

| | | |
|---|---|---|
| KR | 101318684 B1 | 10/2013 |
| KR | 20190141758 A | 12/2019 |
| KR | 1020200169745 | 6/2022 |

OTHER PUBLICATIONS

Korean Office Action for Korean Application No. 10-2020-0169745 dated Jul. 20, 2022 (15 pages) with English Translation.

* cited by examiner

METHOD AND APPARATUS FOR PROVIDING ADVERTISEMENT DISCLOSURE FOR IDENTIFYING ADVERTISEMENTS IN 3-DIMENSIONAL SPACE

TECHNICAL FIELD

The present disclosure in some embodiments relates to a method of providing an advertisement (ad) disclosure for advertisement identification in a three-dimensional (3D) space. More particularly, the present disclosure relates to a method of and an apparatus for providing an ad disclosure for advertisement identification in a 3D virtual space where a user is allowed to identify the advertisement by using the ad disclosure.

BACKGROUND

The statements in this section merely provide background information related to the present disclosure and do not necessarily constitute prior art.

Content platforms such as social media as they develop witness deceptive advertisements that prevent consumers from distinguishing between advertisements and web content. The deceptive advertisements may be, for example, a native advertisement in which ad content is provided according to an inherent format to each content platform. Since the native advertisement is naturally displayed among general contents on the content platform, the advertisement can be provided without interfering with the user experience (UX) of users. However, failure to provide a disclosure for a user to identify an advertisement further to the native advertisement would risk the user's trust in the content.

To solve this problem, the Federal Trade Commission (FTC) of the United States and the European Commission (EC) of the European Union issued guidelines on how to display advertisements online to regulate deceptive advertisements. For example, an ad disclosure is one of the guidelines regarding advertisement display and is inserted in an adjacent position to ad content to allow users to distinguish advertisements from general contents.

FIG. 1 is a diagram for explaining an example ad disclosure provided along with ad content on a web page, according to at least one embodiment of the present disclosure.

FIG. 1 illustrates an AdChoices icon, which is a type of ad disclosure, in a two-dimensional banner advertisement provided on a web page. AdChoices regulations were made in accordance with the FTC's recommendations and the self-regulation program of the US online advertising industry, and they are managed by online advertising associations such as the Digital Advertisement Alliance (DAA). When an advertiser publishes a two-dimensional banner advertisement on a web page, it is supposed to insert an Ad Choice icon in a position adjacent to the ad content for the user to distinguish the ad content from the general content, thereby improving the reliability of the general content. Additionally, the user may use the inserted Ad Choice icon to provide feedback such as displaying a preference for ad content provided on a web page or requesting blocking of related advertisements.

On the other hand, an ad disclosure provided on a web page may be provided in social media further to the Ad Choice icon in a text format such as 'sponsored advertisement' or 'suggested post' in a position adjacent to the ad content.

FIG. 2 illustrates a conventional virtual reality (VR) advertisement with no such ad disclosure as provided by the present disclosure.

FIG. 2 illustrates, in a 3D space, different content objects with advertisement (ad) objects inserted by an advertiser.

The FTC guidelines on advertisement display are regulations applied to all types of digital advertisements provided online. Therefore, even with advertisements provided in 3D environments such as virtual reality (AR) or augmented reality (AR), an ad disclosure needs to be provided along with the ad object. To a greater degree, 3D spaces need an ad disclosure, since an ad object and a content object are provided together on a visual interface, which disables the user from easily distinguishing the ad object.

However, as shown in FIG. 2, when providing a conventional 3D advertisement in a 3D space, an advertising operator fails to present an ad disclosure so definitely as to secure the user's trust in the 3D content, which remains unsolved.

Therefore, there is a need for a method of providing an ad disclosure that enables a user to clearly distinguish an ad object from a content object within a 3D advertisement.

SUMMARY

According to at least one embodiment, the present disclosure provides a method of providing an advertisement disclosure for advertisement identification to a content that is displayed in a 3D space by a visual interface, including detecting an advertisement object located within a user sight from the content, inserting the advertisement disclosure in an adjacent position to the advertisement object, and controlling the advertisement disclosure in position or orientation based on a user gaze upon detecting the user gaze.

The present disclosure in another aspect provides a computer program stored in a computer-readable medium for executing the steps respectively included in the method of providing an advertisement disclosure according to at least one embodiment.

The present disclosure in yet another aspect provides an apparatus for providing content with an advertisement disclosure for advertisement identification, which includes an interface unit, a gaze detection unit, and a control unit. The interface unit is configured to display, in a 3D space, the content including a plurality of virtual objects. The gaze detection unit is configured to track a user's pupil and to detect a user gaze indicating a direction in which the user looks at one or more of the virtual objects. The control unit is configured to detect, from the content, an advertisement object located within a user sight, to insert the advertisement disclosure for advertisement identification in an adjacent position to the ad object, and to control the advertisement disclosure in position or orientation based on the user gaze.

DETAILED DESCRIPTION

Figure 1:
FIG. 1 is a diagram for explaining an example ad disclosure provided along with ad content on a web page, according to at least one embodiment of the present disclosure.

The present disclosure in at least one embodiment seeks to provide a method of controlling an ad disclosure for allowing a user to identify an ad object from among a plurality of content objects displayed in a 3D space.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

As described in some embodiments, a content object means a plurality of objects displayed in a 3D space, of which an object including an advertisement is referred to as an advertisement (ad) object.

The ad disclosure refers to an object that is inserted in an adjacent position to the ad object so that the user can discern the ad object from the content object.

A user's field of view or user sight means a spatial coverage over which a user looking at a 3D space via a visual interface can recognize an object, and the embodiments of the present disclosure assume that the user sight takes a rectangular shape for convenience of description. However, the user sight may be expressed in various shapes by the type of the visual interface and is not limited to the shape according to the illustrated embodiments of the present disclosure.

A user gaze refers to a direction of viewing an arbitrary object from user coordinates in a 3D space when the user looks at an arbitrary object displayed in a 3D space. In embodiments of the present disclosure, for convenience of description, the user gaze is expressed as a direction vector of a 3D space vector in an orthogonal coordinate system. However, the user gaze may be expressed using a polar coordinate system, a cylindrical coordinate system, a spherical coordinate system, and the like, and it is not limited to the embodiments of the present disclosure.

The first direction vector described in the embodiments of the present disclosure means a direction vector in the direction of the user gaze, and the second direction vector means a direction vector toward an ad object from the user coordinates in a 3D space.

Technologies have been developed recently to utilize a visual interface in displaying a virtual object in a 3D space. At least one embodiment of the present disclosure provides a technique for allowing a user to recognize that an object in sight is an advertisement by inserting an ad disclosure in a position adjacent to an ad object and controlling the position and orientation of the ad disclosure.

The description of the present disclosure to be presented below in conjunction with the accompanying drawings is intended to describe exemplary embodiments of the present disclosure and is not intended to represent the only embodiments in which the technical idea of the present disclosure may be practiced.

Figure 3A:
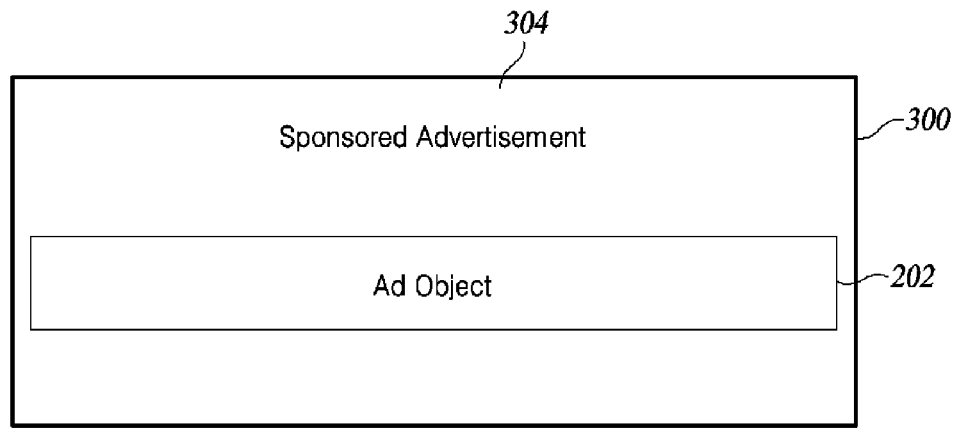
FIG. 3A illustrates the displayed shapes of an ad object in a user's sight when the ad object and an ad disclosure are provided in a 3D space and viewed in different directions, according to at least one embodiment.
Figure 3B:
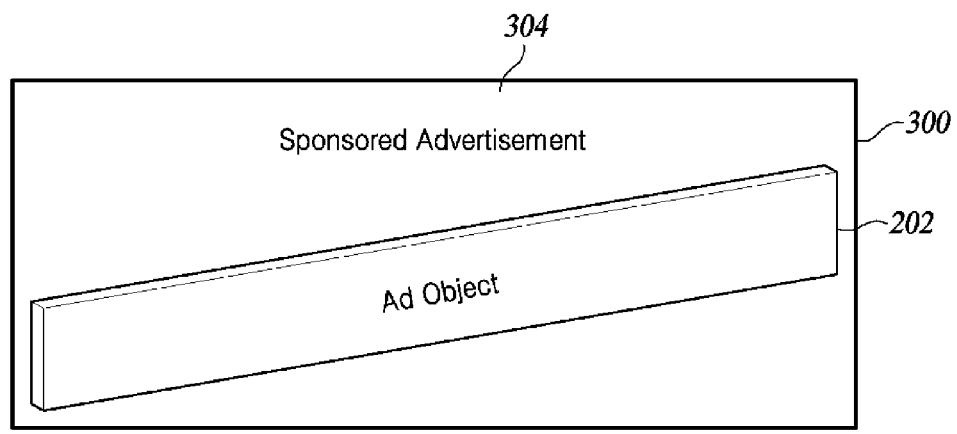
FIG. 3B illustrates the displayed shapes of an ad object in a user's sight when the ad object and an ad disclosure are provided in a 3D space and viewed in different directions, according to at least one embodiment.
Figure 3C:
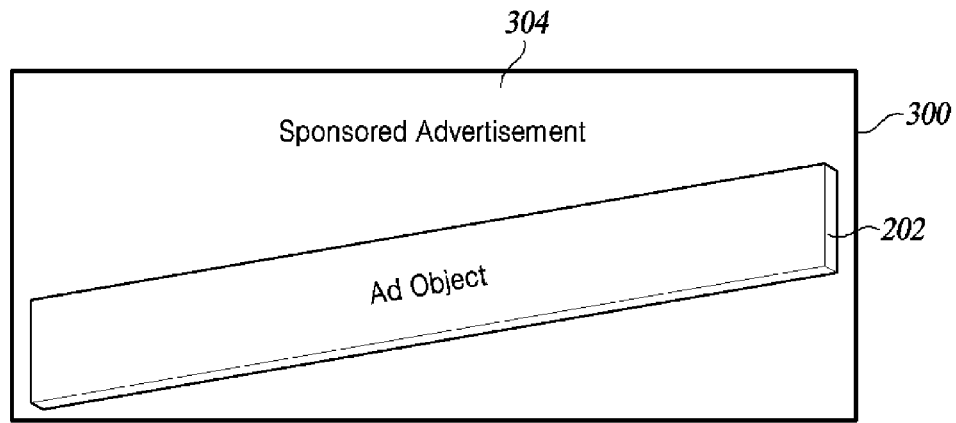
FIG. 3C illustrates the displayed shapes of an ad object in a user's sight when the ad object and an ad disclosure are provided in a 3D space and viewed in different directions, according to at least one embodiment.

FIGS. 3A to 3C illustrate the displayed shapes of an ad object 302 in a user sight 300 when the ad object 302 and an ad disclosure 304 are provided in a 3D space and viewed in different directions, according to at least one embodiment.

As shown in FIG. 3A, the user, when looking at the ad object 302 from the front, sees the ad object 302 and the ad disclosure 304 as displayed in frontal view within the user sight 300 with the ad disclosure 304 being inserted in an adjacent position to the front the ad object 302.

As shown in FIGS. 3B and 3C, the user, when looking at the ad object 302 in a direction other than the front, sees the ad object 302 as displayed in non-frontal view within the user sight 300. However, since the user needs to be able to identify or distinguish the ad object 302 from a content object even when looking at the ad object 302 in a direction other than the front, the ad disclosure 304 needs to be always displayed in frontal view within the user sight 300. For example, whenever the user changes the direction to look at the ad object 302 in accord with changes in user coordinates which means the user's position based on the origin 700 in the 3D virtual space or due to changes in the user gaze, the ad disclosure 304 needs to be rotatable accordingly. By referring to FIGS. 4 to 7, a method in which the ad disclosure 304 rotates in response to the user coordinates or user gaze will be described.

Figure 4:
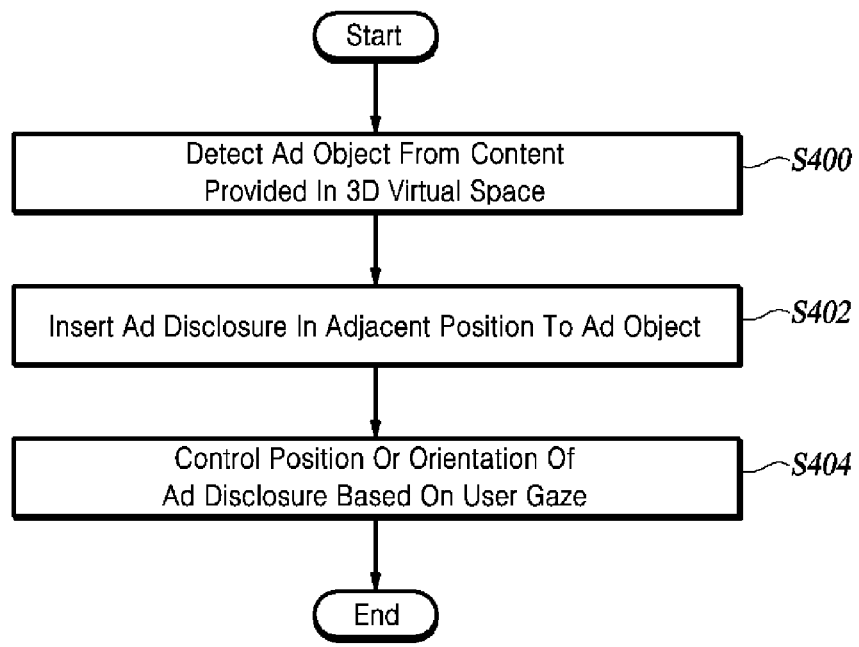
FIG. 4 is a flowchart of a method of providing an ad disclosure, according to at least one embodiment.

FIG. 4 is a flowchart of a method of providing an ad disclosure, according to at least one embodiment.

The ad-disclosure providing apparatus has a control unit that detects the ad object 302 from the content provided in the 3D space (S400). Here, the 3D space may be a space provided by using a user interface (UI) in virtual reality (VR) environment, augmented reality (AR) environment, or mixed reality (MR) environment that is a convergence of VR and AR.

A UI for providing a 3D space according to at least one embodiment of the present disclosure is provided by a display of a VR device, a display of a mobile device, or a wearable device such as smart glasses. For example, the device providing the UI refers to any device capable of expressing a VR or AR environment by using a visual interface and is not limited to the above examples.

Figure 2:
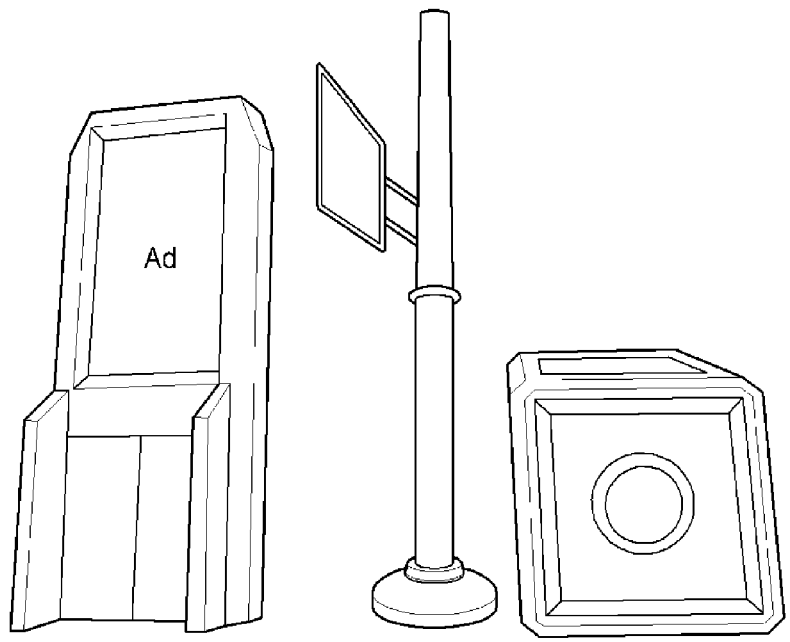
FIG. 2 illustrates a conventional virtual reality (VR) advertisement with no such ad disclosure as provided by the present disclosure.

According to at least one embodiment of the present disclosure, content provided in a 3D space is a 3D video or 3D images that are pre-stored in the ad-disclosure providing apparatus or transmitted in real-time to the ad-disclosure providing apparatus. As described with reference to FIG. 2, included in the content are both the ad object 302 for providing advertisements and a content object. When producing content, a content creator arranges objects each in the content by presetting ad object coordinates and content object coordinates. Here, the ad object coordinates and the content object coordinates refer to coordinates at which each object is positioned with the reference of origin 700 in the 3D space.

The ad-disclosure providing apparatus detects the ad object 302 by extracting ad object coordinates from pre-stored content information or content information transmitted in real-time. Since the ad object coordinates are preset in the content information, the ad-disclosure providing apparatus can easily extract the ad object coordinates from the content information that is pre-stored therein or transmitted in real-time.

The control unit of the ad-disclosure providing apparatus inserts the ad disclosure 304 for the ad identification in the adjacent position to the ad object 302 (S402). As described with reference to FIG. 3, the ad disclosure 304 is a virtual object that allows the user to distinguish the ad object 302 from the content object, so it needs to be inserted at a position adjacent to the ad object 302. The position at which the ad disclosure 304 is inserted may be determined by setting the ad disclosure coordinates in a position adjacent to the ad object coordinates, and the fine value of the ad disclosure coordinates may be varied according to the embodiment.

In at least one embodiment of the present disclosure, the control unit extracts the ad disclosure 304 corresponding to the type of the ad object 302 from several pre-stored types of the ad disclosure 304, and it inserts the extracted ad disclosure 304 into an adjacent position to the ad object 302. Additionally, the ad disclosure 304 may be displayed in the form of text or image in the 3D space, and the specific content and form of the ad disclosure 304 may be variously modified depending on the type of the ad object 302. Meanwhile, the control unit may set the size of the ad disclosure 304 in a preset ratio based on the size of the ad object 302.

The ad-disclosure providing apparatus has a gaze detection unit to detect a user gaze, and the control unit controls the position or orientation of the ad disclosure 304 based on the detected user gaze (S404). A method performed by the gaze detector for detecting the direction of an arbitrary object that the user is gazing at will be described below by referring to FIG. 8.

When the position of the ad object 302 changes, the control unit extracts the continuously changing ad object coordinates and controls the ad disclosure 304 to exist in an adjacent position to the ad object 302. This allows the ad object 302 when moving in the 3D space to be followed along by the ad disclosure 304. Meanwhile, a specific process for the control unit to control the orientation of the ad disclosure 304 based on the detected user gaze will be detailed by referring to FIGS. 5 to 7.

Figure 5:
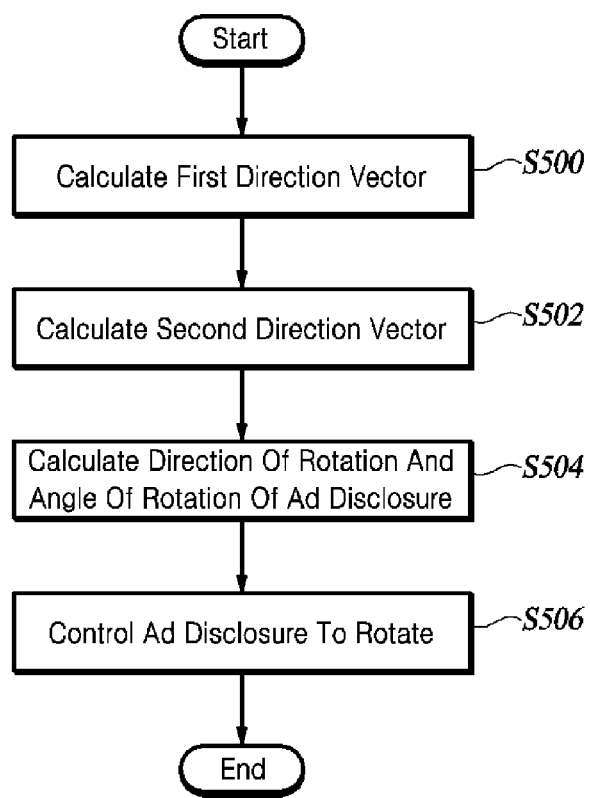
FIG. 5 is a flowchart of a method of rotating an ad disclosure, according to at least one embodiment.

FIG. 5 is a flowchart of a method of rotating an ad disclosure, according to at least one embodiment.

The ad-disclosure providing apparatus causes to the control unit to calculate a first direction vector indicating a direction vector of the user gaze (S500). The first direction vector is a 3D space vector whose magnitude is normalized to 1 and includes information about a direction in which the user gazes an object from user coordinates indicating the user's position in the 3D space.

The control unit calculates, by using the ad object coordinates and the user coordinates, a second direction vector which means a direction vector connecting the ad object 302 from the user (S502). The position of the ad object 302 in the content and the user's position in the 3D space may be expressed as ad object coordinates and user coordinates, respectively, based on the origin 700, and the respective coordinates may be changed in real-time. Accordingly, the control unit detects the ad object coordinates from the content information in real-time and detects the user coordinates based on the image information collected using the camera, thereby calculating the second direction vector.

The control unit utilizes the respective components included in the first direction vector and the second direction vector to calculate and generate a direction of rotation and an angle of rotation of the ad disclosure 304 (S504).

In at one embodiment of the present disclosure, the control unit calculates and generates a crossed angle formed by the first direction vector and the second direction vector, and based on the first direction vector and the calculated crossed angle, the control unit determines the direction of rotation and angle of rotation of the ad disclosure 304. For example, to align the direction from the ad object 302 toward the user with the initial direction that the ad disclosure 304 faces toward, the control unit sets an initial condition. Thereafter, the control unit may use the first direction vector as a basis to determine the direction of the object viewed by the user as the direction of rotation of the ad disclosure 304, and it may determine a preset ratio of rotation angle to the calculated crossed angle as the angle of rotation of the ad disclosure 304. The preset ratio of rotation angle to the crossed angle, for determining the angle of rotation may be varied according to the embodiment.

The control unit controls the ad disclosure 304 to rotate based on the calculated direction of rotation and angle of rotation (S506). In this way, by rotating the ad disclosure 304 by the calculated angle of rotation toward the user's gazing direction to the object, the ad disclosure 304 remains visible in the user's peripheral view even when the user looks at an object other than the ad object 302. This brings the effect of allowing the user to more clearly distinguish the ad object 302 from the content object located in the content.

In another embodiment of the present disclosure, when the first direction vector and the second direction vector coincide, that is, when the user looks at the ad object 302, the control unit can control the ad disclosure 304 to face the user by rotating the ad disclosure 304 toward the negative vector of the second direction vector. Accordingly, as described with FIGS. 3A to 3C, even when the user coordinates change, the user when looking at the ad object 302 can keep facing the ad disclosure 304, letting the user to clearly distinguish the ad object 302 from the content object.

Figure 6:
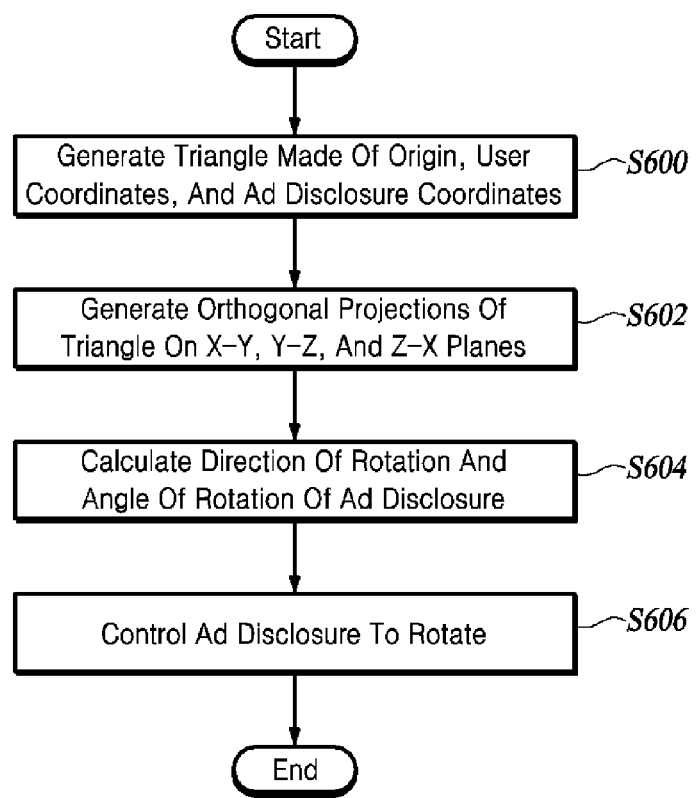
FIG. 6 is a flowchart of a method of rotating an ad disclosure to constantly face the user regardless of the user gaze, according to at least one embodiment.

FIG. 6 is a flowchart of a method of rotating an ad disclosure to constantly face the user regardless of the user gaze, according to at least one embodiment.

Figure 7A:
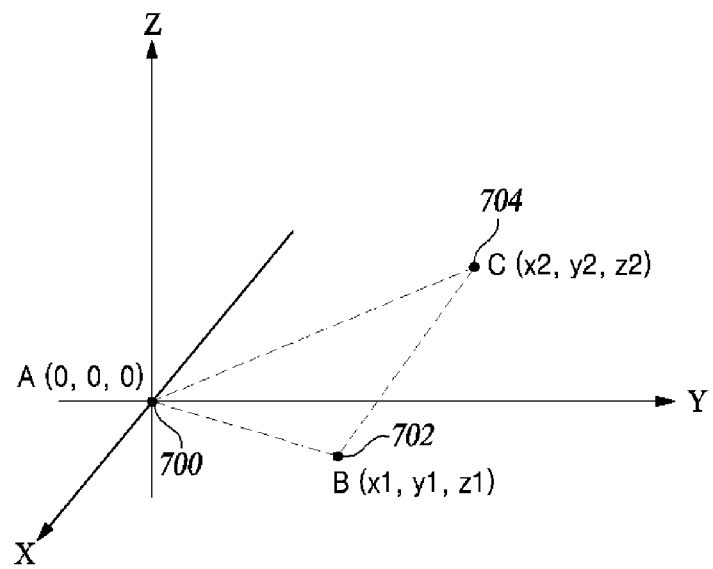
FIG. 7A illustrates a method of determining the direction of rotation and angle of rotation of an ad disclosure by using the origin, user coordinates, and ad object coordinates in a 3D space, according to at least one embodiment.
Figure 7B:
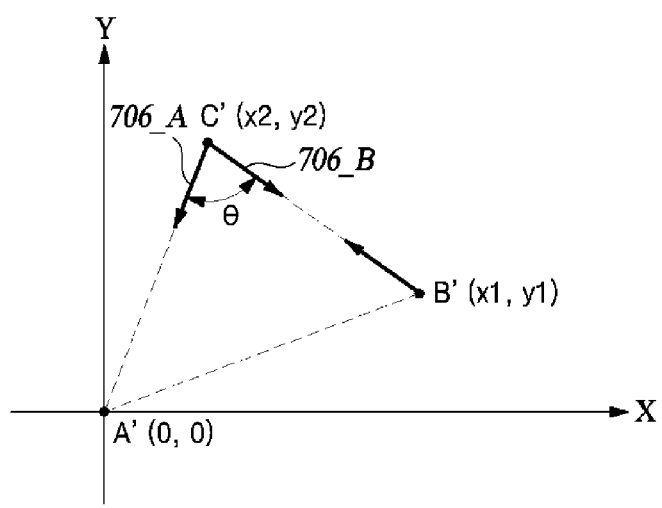
FIG. 7B illustrates a method of determining the direction of rotation and angle of rotation of an ad disclosure by using the origin, user coordinates, and ad object coordinates in a 3D space, according to at least one embodiment.

FIGS. 7A and 7B illustrate a method of determining the direction of rotation and angle of rotation of an ad disclosure by using an origin 700, user coordinates 702, and ad object coordinates in a 3D space, according to at least one embodiment.

The following describes a method of controlling the ad disclosure 304 to constantly face the user by referring to FIGS. 6, 7A, and 7B.

FIG. 7A illustrates the origin 700, the user coordinates 702, and ad disclosure coordinates 704 in a 3D space.

The control unit generates, in a 3D space, an imaginary triangle with the origin 700, user coordinates 702, and ad disclosure coordinates 704 (S600). The origin 700 of the 3D space is a central point for providing the 3D space, and the origin 700 is fixedly positioned. Although the user coordinates 702 may be changed as the user shifts in the 3D space and the ad disclosure coordinates 704 may be changed as the ad object 302 moves, FIGS. 7A and 7B assume that the user coordinates 702 and ad disclosure coordinates 704 remain fixed for the purpose of convenient description and illustration. The control unit may extract the ad disclosure coordinates 704 from the information on the position of the ad disclosure 304 that is inserted in the adjacent position to the ad object 302, and it may track the user's position by using a sensor to extract the user coordinates 702. Meanwhile, a method for the control unit to track a user's position is common in the art, and thus a detailed description thereof will be omitted.

The control unit generates orthogonal projections for the imaginary triangle generated in Step S600 on the x-y plane, the y-z plane, and the z-x plane, respectively (S602).

FIG. 7B shows an orthogonal projection on the x-y plane for the imaginary triangle formed in FIG. 7A.

As expressed in FIG. 7A, the origin 700, user coordinates 702, and ad disclosure coordinates 704 constituting the imaginary triangle utilize 3D spatial coordinates such as (x, y, z). Whereas, since the orthogonal projection on the x-y plane shown in FIG. 7B is in the form of a planar triangle, the vertices constituting the orthogonal projection are each expressed by two-dimensional plane coordinates.

The control unit utilizes the second law of cosines or matrix operation to calculate and generate the direction of rotation and angle of rotation of the ad disclosure 304 for each orthogonal projection (S604).

In at least one embodiment of the present disclosure, the control unit may set an initial direction 706_A so that the plane coordinates of the ad disclosure face the origin 700. Then, the control unit calculates and generates angles of rotation θ on the x-y plane, the y-z plane, and the z-x plane for rotating the ad disclosure 304 toward a target direction 706_B. The control unit calculates and generates angles of rotation θ by using the second cosine law or matrix operation based on the origin 700, the plane coordinates of the ad disclosure, and the user's plane coordinates, and it calculates the internal angles of by using the second cosine law or matrix operation based on the coordinates of the vertices of the triangle.

As shown in 7B, when the distance from B' to C' is 'a', the distance from C' to A' is 'b', and the distance from A' to B' is 'c', the second cosine law establishes Equation 1.

$$c^2 = a^2 + b^2 - 2ab \cos\theta \quad \text{Equation 1}$$

At this time, angle of rotation θ of the ad disclosure 304 on the x-y plane may be expressed as in Equation 2.

$$\theta = \arccos\left(\frac{a^2 + b^2 - c^2}{2ab}\right) \quad \text{Equation 2}$$

Since the range of function y=arc cos(x) is defined from 0 to π, the second cosine law applied may calculate only angle of rotation θ of the ad disclosure 304 on the x-y plane, whose size is less than π. Therefore, after calculating angles of rotation θ according to Equations 1 and 2 by using the lengths of the respective sides of the triangle formed of three vertices A', B', and C', the cross product of vectors needs to be used to determine the direction of rotation of the ad disclosure 304 on the x-y plane.

When the vector of the initial direction 706_A from C' to A' is $v_1$, and the vector of the target direction 706_B from C' to B' is $v_2$, the cross product of the two vectors is expressed as in Equation 3.

$$v_1 \times v_2 = (-x_2, -y_2, 0) \times (x_1 - x_2, y_1 - y_2, 0) = (0, 0, y_2(x_1 - x_2) - x_2(y_1 - y_2)) \quad \text{Equation 3}$$

At this time, according to the property of the cross product, when the z component value is positive, $v_2$ (706_B) is located in the counterclockwise direction from $v_1$ (706_A), and when the z component value is negative, $v_2$ (706_B) is located in the clockwise direction from v1 (706_A), so the direction of rotation of the ad disclosure 304 on the plane may be calculated by using the result of Equation 3. For example, since the z component of the cross product of $v_1$ (706_A) by $v_2$ (706_B) calculated based on the positions of the vertices shown in FIG. 7B has a positive value, the control unit rotates the ad disclosure 304 by angle of rotation θ counterclockwise with respect to the x-y plane.

The control unit may follow the same process as the method of calculating the direction of rotation and angle of rotation of the ad disclosure 304 on the x-y plane to calculate the directions of rotation and angles of rotation of the ad disclosure 304 on the y-z plane and z-x plane. Therefore, the calculation process on the y-z plane and the z-x plane will be omitted below.

By rotating the ad disclosure 304 toward the calculated direction of rotation and angle of rotation, the control unit controls the ad disclosure 304 to face the user (S606). By sequential rotations of the ad disclosure 304 for the x-y plane, y-z plane, and z-x plane, the ad disclosure 304 can constantly and directly face the user regardless of the user gaze. In other words, by recognizing the ad disclosure 304, the user may clearly distinguish the ad object 302 from the content object in the content.

Figure 8:
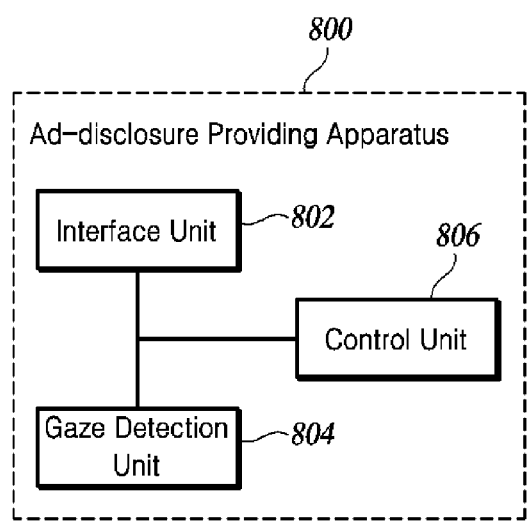
FIG. 8 is a block diagram of an ad-disclosure providing apparatus, according to at least one embodiment of the present disclosure.

FIG. 8 is a block diagram of an ad-disclosure apparatus 800, according to at least one embodiment of the present disclosure.

The ad-disclosure providing apparatus 800 includes all or some of an interface unit 802, a control unit 806, and a gaze detection unit 804.

The ad-disclosure providing apparatus 800 shown in FIG. 8 is according to at least one embodiment of the present disclosure, and not all blocks shown in FIG. 8 are essential components. In other embodiments, some blocks included in the ad disclosure apparatus 800 may be added, changed, or deleted. For example, the ad-disclosure providing apparatus 800 may further include a data storage unit (not shown) for storing content provided to a user or a communication unit (not shown) for receiving content from an external device in real-time. Meanwhile, the data storage unit included in the ad-disclosure providing apparatus 800 may operate as a module within the apparatus, and may be implemented as an individual storage device such as a direct attached storage (DAS), network attached storage (NAS), storage area network (SAN).

The interface unit 802 displays content including a plurality of virtual objects in a 3D space. The interface unit 802 may be implemented by using any device capable of expressing a virtual reality (VR), augmented reality (AR), or mixed reality (MR) environment. A specific example of the interface unit 802 may be the same as described by referring to FIG. 4.

The gaze detecting module 804 detects a user gaze indicating a direction in which the user looks at a virtual object by tracking a user's pupil. The gaze detection unit 804 collects an image of the user's pupil by using an infrared camera and processes the collected image to detect the user gaze. A detailed method of detecting the user gaze by the gaze detection unit 804 is generally known in the art, and a detailed description thereof will be omitted.

As described with reference to FIGS. 4 to 6, the control unit 806 is adapted to detect the ad object 302 from the content provided in the 3D space, to insert the ad disclosure 304, to control the position and orientation of the ad disclosure 304 so that the user can clearly distinguish the ad object 302 from the content object within the content. The method performed by the control unit 806 for controlling the position and orientation of the ad disclosure 304 has been described with reference to FIGS. 4 to 6 and will not be repeated here.

Although FIGS. 4 to 6 present Steps of S400 to S404, Steps S500 to S506, and Steps S600 to S606 as being sequentially performed, they merely instantiate the technical idea of some embodiments of the present disclosure. For example, a person having ordinary skill in the pertinent art could incorporate various modifications, additions, and substitutions in practicing the present disclosure by changing the sequence of steps illustrated by FIGS. 4 to 6 or by performing one or more of Steps S400 to S404, Steps S500 to S506, and Steps S600 to S606 thereof in parallel, and hence the steps in FIGS. 4 to 6 are not limited to the illustrated chronological sequences.

Various implementations of the apparatus and method described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

Various implementations of the apparatus and method described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, transitory media such as a data transmission medium, or the like. Further, the computer-readable recording medium can be distributed in computer systems connected via a network, wherein the computer-readable codes can be stored and executed in a distributed mode.

As described above, according to some embodiments of the present disclosure, an ad disclosure is inserted in a position adjacent to an ad object in a 3D space and is controlled for the user's identification of the ad disclosure, to effect improved user's trust in the content provided in the 3D space.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method of providing content with an advertisement disclosure in an apparatus including an interface unit, a gaze detection unit, and a control unit, the method comprising:
    detecting, by the control unit, an advertisement object located within a user sight from the content that is displayed in the interface unit in a three-dimensional space by a visual interface;
    inserting, by the control unit, the advertisement disclosure for advertisement identification in an adjacent position to the advertisement object; and
    controlling, by the control unit, a position or direction of the advertisement disclosure based on a user gaze upon detecting the user gaze by the gaze detection unit,
    wherein the controlling comprises:
    generating, in a three-dimensional space, a triangle using an origin, user coordinates, and advertisement disclosure coordinates obtained by the inserting of the advertisement disclosure;
    generating orthogonal projections for the triangle on an x-y plane, a y-z plane and a z-x plane, respectively;
    calculating a direction of rotation and an angle of rotation of the advertisement disclosure for each of the orthogonal projections using a matrix operation; and
    controlling the advertisement disclosure to rotate by the direction of rotation and the angle of rotation, for rendering the advertisement disclosure to face the user.

2. The method of claim 1, wherein the detecting of the advertisement object comprises:
    extracting advertisement object coordinates from pre-stored content information or content information transmitted in real time.

3. The method of claim 2, wherein the controlling comprises:
    calculating and generating a first direction vector indicating a direction vector of the user gaze;
    calculating and generating a second direction vector indicating a direction vector connecting from a user to the advertisement object by using the advertisement object coordinates and user coordinates;

calculating and generating a direction of rotation and an angle of rotation of the advertisement disclosure by using components respectively included in the first direction vector and the second direction vector; and controlling the advertisement disclosure to rotate based on the direction of rotation and the angle of rotation which are generated.

4. The method of claim 3, further comprising:

controlling, when the first direction vector and the second direction vector coincide, the advertisement disclosure to face the user by rotating the advertisement disclosure in a direction of a negative vector of the second direction vector.

5. The method of claim 1, wherein the advertisement disclosure is displayed in a text form or an image form in the three-dimensional space.

6. The method of claim 1, wherein the advertisement disclosure is sized according to a preset ratio based on a size of the advertisement object.

7. The method of claim 1, wherein the controlling comprises:

controlling, in response to a change in position of the advertisement object, the advertisement disclosure to move to the adjacent position to the advertisement object.

8. The method of claim 1, wherein the three-dimensional space comprises:

a space provided in any one of a virtual reality (VR) environment, an augmented reality (AR) environment, or a mixed reality (MR) environment.

9. A computer program stored in a computer-readable medium for executing the steps respectively included in the method of providing an advertisement disclosure according to claim 1.

10. An apparatus for providing content with an advertisement disclosure for advertisement identification, comprising:

an interface unit configured to display, in a three-dimensional space, the content including a plurality of virtual objects;

a gaze detection unit configured to track a user's pupil and to detect a user gaze indicating a direction in which the user looks at one or more of the virtual objects; and a control unit configured to detect, from the content, an advertisement object located within a user sight, to insert the advertisement disclosure for advertisement identification in an adjacent position to the advertisement object, and to control the advertisement disclosure in position or direction based on the user gaze, wherein the control unit is configured to generate, in a three-dimensional space, a triangle using an origin, user coordinates, and advertisement disclosure coordinates obtained by the inserting of the advertisement disclosure, generate orthogonal projections for the triangle on an x-y plane, a y-z plane and a z-x plane, respectively, calculate a direction of rotation and an angle of rotation of the advertisement disclosure for each of the orthogonal projections using a matrix operation, and control the advertisement disclosure to rotate by the direction of rotation and the angle of rotation, for rendering the advertisement disclosure to face the user.

* * * * *